(12) United States Patent
Mekala et al.

(10) Patent No.: US 7,486,665 B2
(45) Date of Patent: Feb. 3, 2009

(54) TRANSPORT OF DTMF TONES OVER VOATM/VOIP NETWORKS

(75) Inventors: Anantha R. Mekala, Leominster, MA (US); Subrahmanyam V. Kunapuli, Cupertino, CA (US); Jason A. Kuhne, Acton, MA (US); Salman Haider, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 827 days.

(21) Appl. No.: 10/994,559

(22) Filed: Nov. 22, 2004

(65) Prior Publication Data

US 2006/0083220 A1     Apr. 20, 2006

Related U.S. Application Data

(63) Continuation of application No. 10/965,091, filed on Oct. 14, 2004, now abandoned.

(51) Int. Cl.
H04L 12/66 (2006.01)
H04J 3/12 (2006.01)

(52) U.S. Cl. ............. 370/352; 370/526; 379/93.26
(58) Field of Classification Search ........ 370/352, 370/356, 501, 526; 379/88.17, 93.26, 418
See application file for complete search history.

(56) References Cited

U.S. PATENT DOCUMENTS 5,010,567 A * 4/1991 Tsushima .......... 379/77
5,438,618 A * 8/1995 Jantzi et al. ........ 379/142.18
5,638,436 A * 6/1997 Hamilton et al. ..... 379/351
6,259,691 B1   7/2001 Naudus
6,961,424 B1 * 11/2005 Vialle et al. .......... 379/418
2002/0154760 A1  10/2002 Branden
2004/0101128 A1   5/2004 Sauvage et al.

OTHER PUBLICATIONS

RFC2833, RTP Payload for DTMF Digits, Telephone Tones and Telephony Signals, Internet RFC/STD/FYI/BCP Archives, http://doc.rz.ifi.lmu.de/rfc/rfc2822/html., pp. 1-23.

* cited by examiner

*Primary Examiner*—Wing F Chan
*Assistant Examiner*—Saba Tsegaye
(74) *Attorney, Agent, or Firm*—Hamilton Brook Smith Reynolds, P.C.

(57) ABSTRACT

A communication device, such as a Voice over Internet Protocol (VoIP) gateway, determines a duration for Dual Tone Multi-Frequency (DTMF) tone portions of telephony signal. If the duration is less than a pre-determined amount, a minimum duration is enforced during DTMF playback at a remote end of a network connection connected to a destination gateway. Minimum playback duration can be enforced at the terminating gateway—however, the originatinggateway can also encode a DTMF packet with a minimum duration value. At the terminating receiver it is not always possible to playback exactly what happened at the originating point in the same time frame. One solution to is to, at the terminating gateway, drop the first portion of voice packets that overlap with the end portion of played back DTMF tones.

23 Claims, 5 Drawing Sheets

TRANSPORT OF DTMF TONES OVER VOATM/VOIP NETWORKS

RELATED APPLICATION(S)

This application is a continuation of U.S. application Ser. No. 10/965,091, filed Oct. 14, 2004 now abandoned. The entire teachings of the above application are incorporated herein by reference.

BACKGROUND OF THE INVENTION

This invention relates generally to digital telephone networks, and in particular to techniques for transporting Dual Tone Multi Frequency (DTMF) digits over packet networks.

The Internet and other packet switched networks are increasingly used as a transmission medium for voice telephone calls. Internet telephony software and services now provide low cost, or even free, telephone calls anywhere in the world. With simple equipment at the subscriber end, a virtual connection can be established between two callers through a system of interconnected packet-based networks that may include the Internet, intranets or other digital networks. The Internet is thus emerging as a viable alternative to legacy analog, circuit switched networks, as long as users can tolerate occasional delays and sometimes inferior quality of service.

In order to facilitate communication over the Internet, various industry and international standards bodies have established different functional requirements and rules that govern transmission of data packets. Implementation of these common rules, known as "protocols", is necessary to allow equipment provided by different manufacturers to inter-operate.

One typical device within a packet network is a so-called gateway. Gateways allow dissimilar computer networks that might use different protocols to connect with one another. A gateway provides, in effect, an interface that translates data between the different communication protocols used. One type of gateway is an Internet Protocol (IP) telephony gateway. A typical IP gateway designed to handle telephone calls can handle multiple simultaneous calls from standard telephone connections originating within the Public Switched Telephone Network (PSTN), and route them over packet networks such as the Internet.

In a typical Voice over Internet Protocol (VoIP) connection, a caller located at an origin point places a telephone call using a standard telephone or computer modem. The call is then routed to a local "originating" Internet telephony gateway which is connected to the Internet. The originating gateway then establishes one or more Internet "sessions" with a remote or "terminating" gateway that services the telephone at the other end of the call. The terminating gateway then completes the circuit by connecting to the destination telephone via a local circuit switched network connection.

In order to communicate voice audio signals in an Internet-based telephone system, the gateways operate on audio signals received from and transmitted to the parties' telephones. These audio signals are typically digital Pulse Code Modulated (PCM) signals that may be formulated according to various standards.

At the origin point, equipment is used to sample digitize and encode an analog voice signal. The encoded bits are then arranged into packets for transmission over the packet networks that provide the virtual connection. At the termination point, other equipment dissembles the packets, decodes the sample bits, and converts them back to an analog voice signal again.

One transport protocol often used for carrying VoIP voice packets between gateways is the Internet Engineering Task Force (IETF) Real Time Transport Protocol (RTP), as defined in Request for Comment (RFC) 1889. RFC 1889 has now been placed into the International Telecommunications Union's (ITU) standard H.225.0.

There has been a challenge, however, in determining how best to carry push button tones, technically referred to as Dual Tone, Multi-Frequency (DTMF) digits. DTMF digits are typically generated as sequences of sine waves, either added or modulated on the voice signal. DTMF digits are now almost universally used as dialed number digits to establish a telephone call connection. Correct transmission of DTMF digits is also important to a caller, however, even after the end-to-end connection is made. For example, the operation of voice mail and other systems such as Interactive Voice Response (IVR) systems are heavily reliant on correct reception of DTMF digits.

In a VoIP connection that uses the RTP protocol, each end of an RTP trunk typically encodes the voice samples with an appropriate coding scheme, such as the so-called G.711, G.723 or G.729 codecs. Equipment that uses linear codecs such as G.711 do not pose a problem since they can faithfully pass the DTMF tones end to end. However, non-linear codecs such as G.723 and G.729 introduce compression to the digital samples. Therefore, these codecs do not pass DTMF tones reliably.

Thus, a gateway presently has two options for handling DTMF digits. First, it can use only a linear codec and make no attempt to handle DTMF tones differently from voice samples. However, when compression codecs are desirable, an originating gateway can detect and recognize an individual DTMF digit and translate it into a data value. The data value can then be encoded into a special type of packet. Upon receipt of this packet at the terminating point, the receiver can then reproduce the corresponding DTMF tone signal.

For example, DTMF tones and other named telephony events (such as modem tones, fax tones, etc.) can be generated packets containing as data values, as described in the proposed standard known as RFC 2833. RFC 2833 is an IETF "standards track" proposal for carrying DTMF digits as RTP packets. According to this standard, the packet includes a data value indicating the particular DTMF digit, as well as a volume and a duration for each DTMF digit.

A time duration of from 60 through 80 milliseconds (ms) has historically been considered to be the minimum sufficient for reliable transport of DTMF tones through a circuit switched network. However, a common expectation is now that originating equipment can transmit a minimum DTMF tone duration of as little as 50 ms, and that receiving equipment should be capable of detecting any DTMF tone of at least 45 ms. Such requirements are, for example, promulgated by the International Telecommunications Union (ITU) in the Q.24 specification.

Accommodation of these shorter DTMF tone durations has not necessarily been a problem in circuit switched networks which can faithfully reproduce short tones via their dedicated end to end connections. This also does not typically pose a problem for the initial DTMF digits that make up a dialed telephone number, since those are not used by gateways.

Such relatively short duration DTMF tones do become a problem when they are needed during a call in progress, such as to control advanced voice applications like voice mail, telephone banking systems, and other Integrated Voice Response (IVR) systems located at the other end of a VoIP connection. These systems are intended to be controllable by a user through a telephone handset after the initial end-to-end connection is made. Once connected, a user is typically presented with menus that are to be navigated by sending DTMF tones from the user handset. Problems may occur, however, when using such systems if an intermediate network, such a VoIP network, introduces the possibility of cutting off such tones.

For example, an originating VoIP gateway might take 5 to 10 ms to detect a DTMF tone. This delay in detection time may introduce an error into the duration measurement. Thus, a DTMF tone which was originally received with a duration of 45 ms may be detected at the originating gateway as only being between 35 and 40 ms long. This in turn might cause some equipment to miss a DTMF digit.

An additional difficulty is presented by the fact that it is not always possible to playback tones at the destination with the same duration originally created at the origin point. Thus, even if the tone duration can be correctly reproduced, other impairments in the network introduce an additional complication.

SUMMARY OF THE INVENTION

The present invention is a communication technique for reliably transporting Dual Tone Multi-Frequency (DTMF) tones. In a typical arrangement, a first telecommunication device is connected to a second telecommunication device via a packet network. For example, the invention may be implemented in an originating gateway that has a telephone network interface for receiving a telephony signal from a first communication device.

According to aspects of the invention, a DTMF controller separates DTMF tone portions of the telephony signal from the audio signals, and determines their duration. If the duration of the DTMF tone portion is less than a pre-determined amount, such as 50 ms, a minimum DTMF duration is enforced when the DTMF tone is played back at a remote end of a network connection connected to a destination gateway.

Thus, if the tone duration detected by the originating gateway is only 45 ms, or even as small as 40 ms, then the duration of the played back DTMF packet will be at least a minimum amount instead (e.g., 50 ms).

In addition, the gateways should allow tones of greater than minimum duration to pass through unaltered. For example, if a DTMF tone of 60 ms was initiated at originating terminal equipment, but is detected as being 55 ms in duration at the originating gateway, then parameters of a DTMF tone packet will be set to indicate the measured duration of 55 ms. Since the detected duration is greater than the predetermined minimum duration (50 ms), the actual duration is thus sent in the DTMF packet.

There are several ways to enforce minimum duration for playback. For example, the minimum playback duration can be enforced at the terminating gateway. However, in a preferred embodiment, the minimum duration is enforced at the originatinggateway, by encoding the DTMF packet with a minimum duration value.

In the preferred embodiment, the DTMF tone is otherwise encoded as an RTP packet in accordance with standards such as the RFC 2833, with sequence numbers, time stamps, synchronization, identifiers, volume and digit identifiers, etc at the originating gateway.

In accordance with other aspects of the invention, since minimum tone durations are enforced, it is possible that the duration of tone signals generated at the terminating gateway may actually be longer than the actual duration of signals generated at the origin. For example, an actual tone of duration of 40 ms at an originatingpoint may have to be played back at the terminating gateway for a minimum of 50 ms. Therefore, at the terminating receiver it is not always possible to playback exactly what happened at the originatingpoint in the same time frame.

One solution to this problem is to, at the terminating gateway, drop the first portion of voice packets that overlap with the end portion of played back DTMF tones. In other words, preference is given to playing back DTMF tones during the time extension period, during which time voice packets are suppressed. DTMF tones can then play through completely with their minimum durations. This approach also avoids having to send information to the terminating gateway to specially process packets which might otherwise complicate packet network protocols. This is a preferred solution since it is common for voice signals to not be present in an audio signal immediately after the tones are played. That is, after pressing a digit, most telephone users do not speak again for at least a fraction of a second after dialing.

This approach to suppressing the initial voice signal portion can be implemented at the terminating gateway, but is advantageously implemented at the originatinggateway, since the actual tone detections are known there. For example, the originatinggateway can determine a corresponding number of voice packets that overlap in time with the expected tone playback. These voice packets can then there be dropped, and never sent to the terminating gateway.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A detailed description of a preferred embodiment of the invention follows.

The present invention may be implemented in a voice communication system that uses packet switched networks of various types. In such networks, connections are made between two (or more) ends using communication protocols such as Internet Protocol (IP), Asynchronous Transfer Mode (ATM) or other packet-based protocols. As is well known in the art, such networks may use certain communication devices known as gateways to convert audio signals originating from telephone equipment, or other audio signal sources, to digital data in packet format, such as the so-called RTP or AAL2 formats.

It should be understood by one of skill in the art that although the description below is directed at using the Internet as a packet network, any wide area network or even local area capable of transporting data packets representing telephone signals can be used. Therefore, any references made to specific packet network configurations or protocols in this description are therefore by way of example only, and many other alternatives are possible.

Figure 1:
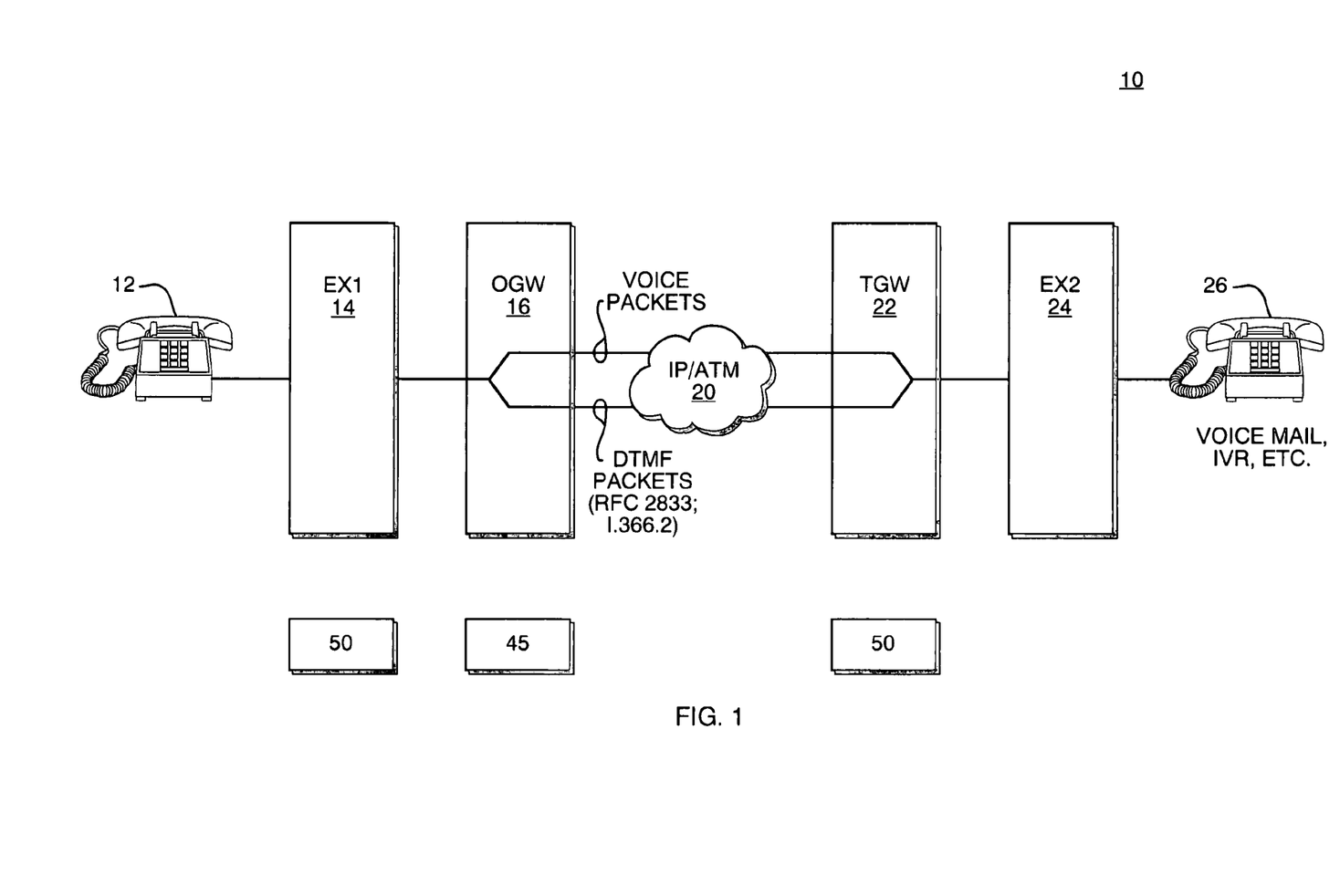
FIG. 1 is a block diagram of packet network based telephony system in which the present invention may be used, illustrating how DTMF packet durations are modified.

FIG. 1 is a block diagram of one possible system 10 in which the invention may be used. The system 10 consists of a first telecommunication device 12 that is connected, via a first local exchange 14, (such as the Public Switch Telephone Network (PSTN)) to an Originating Gateway 16 (OGW). The OGW 16 is, in turn, connected to a packet-based network 20 such as may use Internet Protocol (IP), Asynchronous Transfer Mode (ATM) or other network layer protocols to transfer data packets from one point to another.

A second gateway, referred to herein as the Terminating Gateway (TGW) 22, communicates via a second local exchange 24 through a PSTN to communicate with another telecommunication device 26 at a remote endpoint. The other telecommunication device 26 may include any device capable of communicating audio signals over the PSTN. For example, these may include standard telephones, or equipment that provides services such as Integrated Voice Response (IVR) systems, voice mail services, banking services, order processing services and any other services that may use Dual Tone Multi-Frequency (DTMF) digits as user input.

The gateways 16, 22 are connected to a network 20, which may for example, be the Internet infrastructure capable of supporting the well known Transmission Control Protocol/Internet Protocol (TCP/IP) or Unigram Data Protocol/Internet Protocol(UDP/IP) transport/method protocols. Alternatively, other computer networks such as one or more private IP networks, wide area networks or a Local Area Network (LAN) configurations may also be used.

It should also be understood that while the exchanges 14 and 24 are explained herein as originating signals to and from the PSTN, that other types of connections from telecommunications equipment 12, 26 are possible.

Although not shown in FIG. 1, it should also be understood that other functions such as gatekeepers operating in connection with the H.323 protocol or similar devices manage access to the switched network 20 and the routing of connections between the gateways 16 and 22.

The first exchange 14 and second exchange 24 are, in one embodiment, the local exchanges to which the first telecommunication device 12 and the second telecommunication device are connected, respectively. The first and second telecommunication devices 12 and 26 are connected to their respective local exchanges in any conventional way. For example, these may include connecting via Plain Old Telephone Service (POTS) line, Integrated Services Digital Network (ISDN) connections, or T1 or E1 carrier transport lines.

To place a call, the user of telephone equipment 12 at the originatingpoint dials to a central office switch in the exchange 14. Dialing may involve the use of various types of signaling bits, although in most instances, dialing will be accomplished by using DTMF tones, which are multiplexed with the actual voice trunk lines.

In any event, the exchange 14 forwards the call to the gateway 16 using standardized signaling such as by detecting the telephone number supplied to the exchange via DTMF tones. A central office switch at the first local exchange 14 then supplies the destination telephone number to the originating gateway 16 such as, for example, provided via a channelized T1 signal connection between them. The originating gateway 16 then queries an available database (not shown) to obtain a transport address of the terminating gateway 22 that is nearest to the destination exchange 24 that contains destination equipment 26. All of this occurs in a manner which is well known in the art, such as via H.323 compliant protocols or Q.931 protocols for setting up calls between gateways 16 and 22. Other methods are also possible, such as using "switch independent" gateways.

Once a connection is made, an audio signal carrying the user's voice, and any dialed DTMF signals, are carried in full duplex between the gateways, as packet data. The OGW 16 will typically separate voice data from DTMF data, and send them in different packet formats over separate end to end connections. For example, voice packets may be encoded in accordance with VoIP or VoATM protocols.

DTMF tones will be separately encoded per RFC 2833 (in the case of IP transport network 20), or according to I.366.2 (in the case of an ATM network 20).

The reverse process occurs at the Terminating Gateway (TGW) 22. Voice packets and DTMF packets are received and then recombined prior to being fed to the second exchange 24.

The present invention seeks to eliminate one difficulty with certain prior art configurations regarding the handling of DTMF tones by the gateways 16 and 22. In particular, a DTMF tone may originate at the telephone equipment 12 with a certain duration such as, for example, 50 ms. However, by the time the tone travels through the exchange 14 and is detected at the originating gateway 16, it may be that the tone is detected as being only 45 ms long. While this is not a problem necessarily at the OGW 16, the shortened duration, as detected, may subsequently cause difficulty with equipment 26 connected to the TGW 22.

The present invention, therefore, seeks to ensure that the minimum required DTMF tone duration is transmitted through the network 20 even when the duration detected by the originating gateway is less than a certain minimum amount. This ensures that any DTMF tone at the output of the TGW 22 is always generated with at least a minimum acceptable duration.

The present invention can accomplish this in several different ways. To understand one way of doing so, please turn attention now to FIG. 2, where there is shown a more detailed view of the OGW 16. An input telephony signal, as received from the exchange 14, is fed to first a squelch circuit 40. Squelch circuit 40 separates the DTMF tones from the voice in the input telephony signal. The voice signals are then steered to a voice coder/decoder (codec) 50. Voice codec 50 formats voice samples in connection with various known telephony standards, to produce a set of coded samples and a time stamp.

Figure 2:
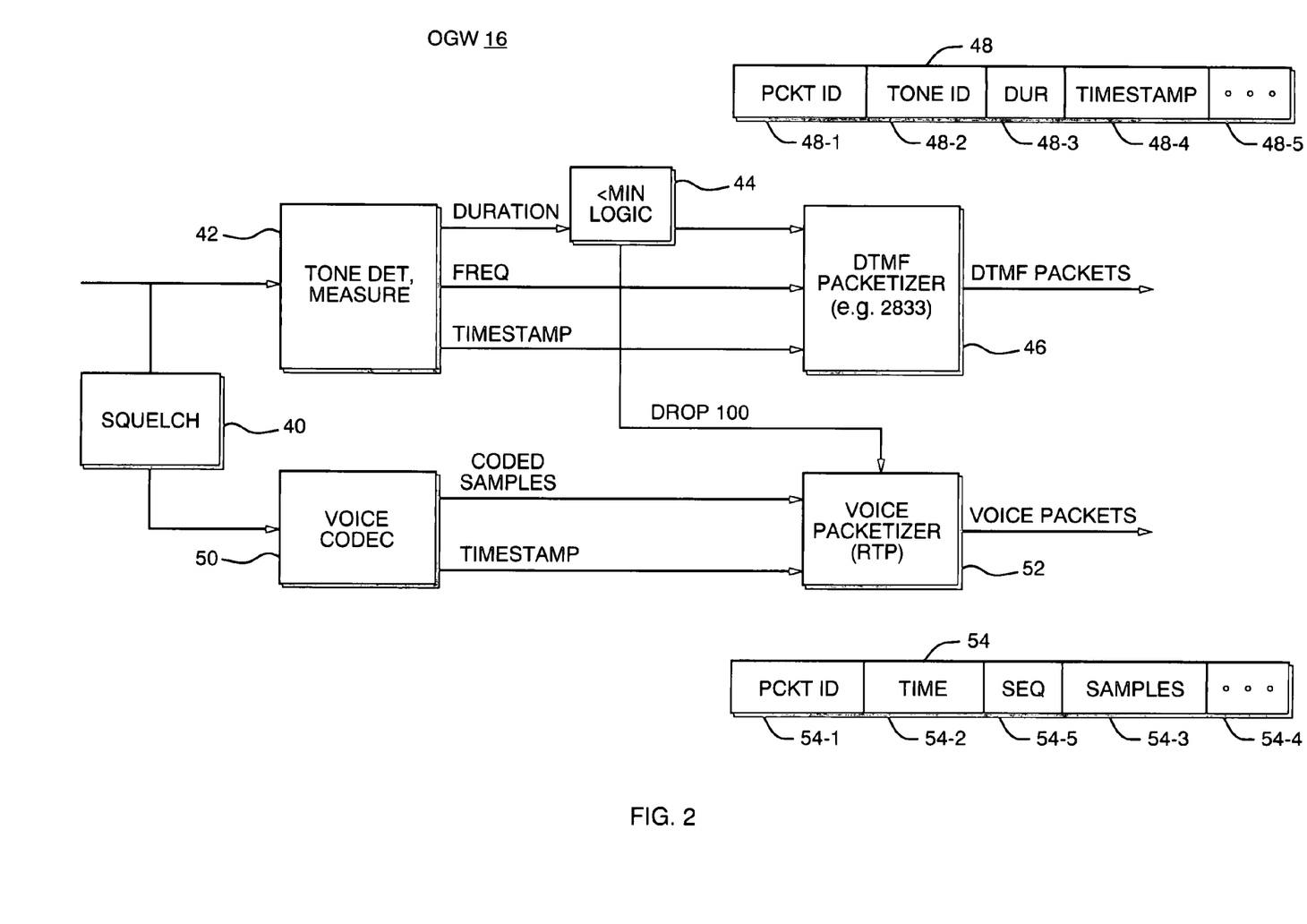
FIG. 2 is a diagram of the packet portion of an Originating Gateway (OGW).

The coded samples and time stamp are then fed to a voice packetizer 52 which then formats the coded voice samples as packets. The voice packetizer 52 may packetize the voice samples in any well-known configuration, such as the Real Time Transport Protocol (RTP) or its variants as specified by the IETF. In general, these voice packets have a format 54 which includes a packet identifier 54-1, a time stamp 54-2, voice samples 54-3, a sequence number 54-5, along with other fields 54-4 as defined by the specific packet standards in use.

The DTMF tone digits are fed to a different part of the OGW including a tone detector and measurement circuit 42, less-than-minimum-logic 44, and a DTMF packetizer 46.

The tone detector and measurement circuit 42 determines various attributes of received DTMF tones, such as their duration, frequency and time of occurrence. Most importantly, this circuit 42 provides an accurate measurement of the detected tone duration, which is then fed to the less-than-minimum-logic 44. Logic 44 determines whether or not the tone duration is less than the predetermined amount, such as 50 ms.

Assuming for the moment that the tone duration is greater than 50 ms, then the actual detected duration is encoded as a data word and included in a packet 48 representing the DTMF tone. The packet 48 has several fields including the packet identifier 48-1, a tone identifier indicating the dialed DTMF digit frequenc(ies) 48-2, the duration field 48-3 and time stamp 48-4, along with other fields 48-5. The particular details of the packet format 48 can otherwise be in accordance with any appropriate standard (such as RFC 2833, I.366.2, etc.) that may be used for encoding DTMF tones.

In the event that the measured duration of the DTMF tone is less than the minimum allowed amount (50 ms), then the logic 44 forces a minimum duration of at least 50 ms to occur, at least at the playback location in the terminating end. The forced minimum duration is thus inserted into the duration field 48-3 rather than a tone of the actually measured duration.

Figure 3:
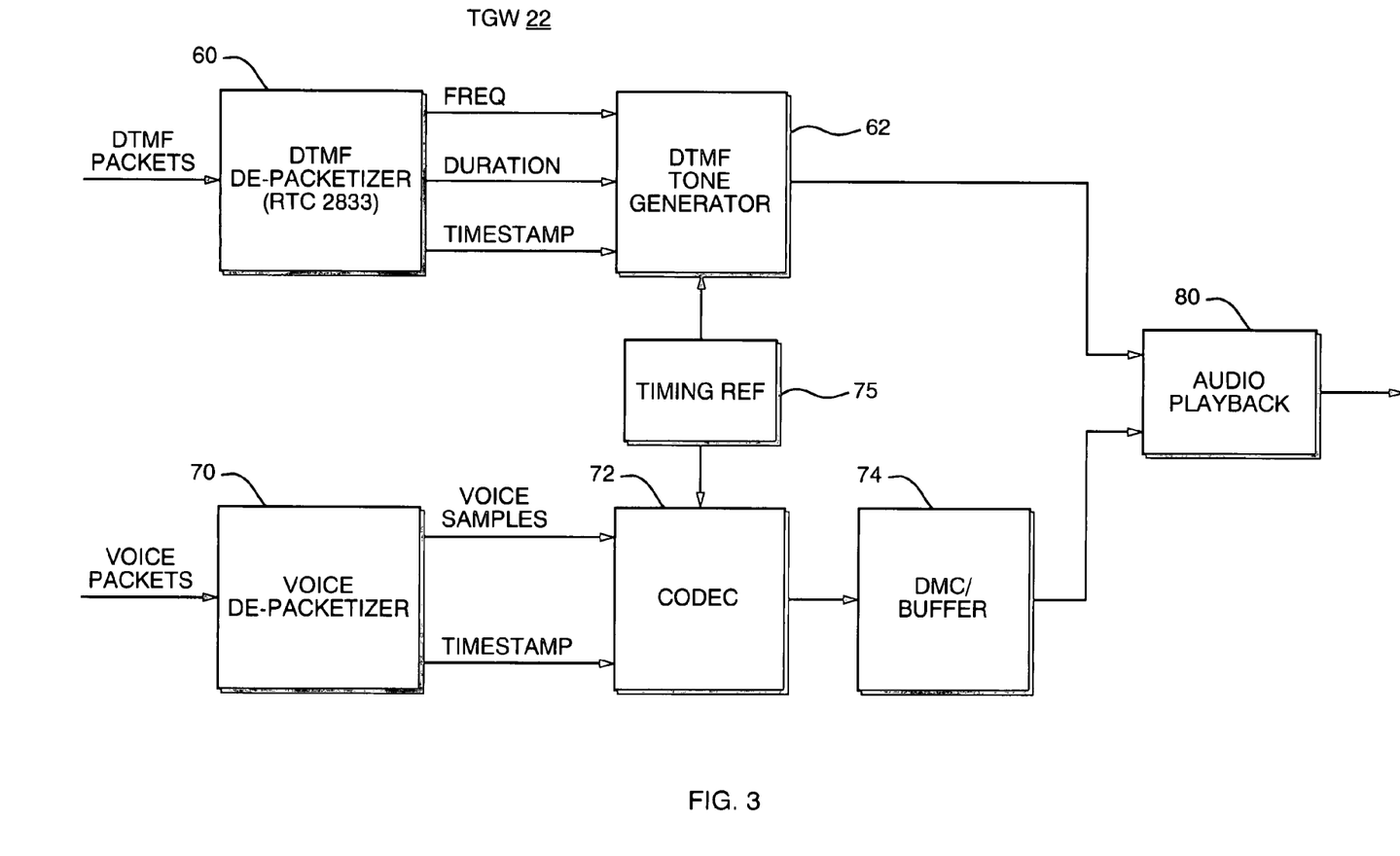
FIG. 3 is a more detailed diagram of the packet processing portion of a Terminating Gateway (TGW).

FIG. 3 shows a more detailed view of packet-processing portions of the Terminating Gateway (TGW) 22. This will include a least a DTMF de-packetizer 60, a DTMF tone generator 62, a voice de-packetizer 70, a codec 72, a digital analog converter and buffer 74, timing reference circuit 75, and audio playback circuitry 80.

DTMF packets are first received at the DTMF de-packetizer 60 which reconstructs packets from, for example, the RFC 2833 format. The de-packetizer 60 reads the tone frequency 48-2, duration 48-3 and time stamp 48-4 fields from the packet 48, forwarding them to the DTMF tone generator 62.

The tone generator 62 then generates an analog signal version of the requested DTMF tone. A timing reference generator 75 ensures that the tone is generated at the appropriate time, as indicated by the time stamp field 48-3 in the packet 48.

The voice de-packetizer 70 receives voice packets from the associated far end connection, separating the voice samples and forwarding them to a codec 72. The codec 72, having the time stamp information and operating in connection with DAC/buffer, can then playback the voice samples at the appropriate time. Voice audio signals are then fed to the audio circuitry 80.

It can now be understood, therefore, that even if the OGW 16 detects a packet duration of only 45 ms, the invention will cause the DTMF tone generator at the TGW 22 to playback a DTMF tone of at least 50 ms in duration.

Figure 4:
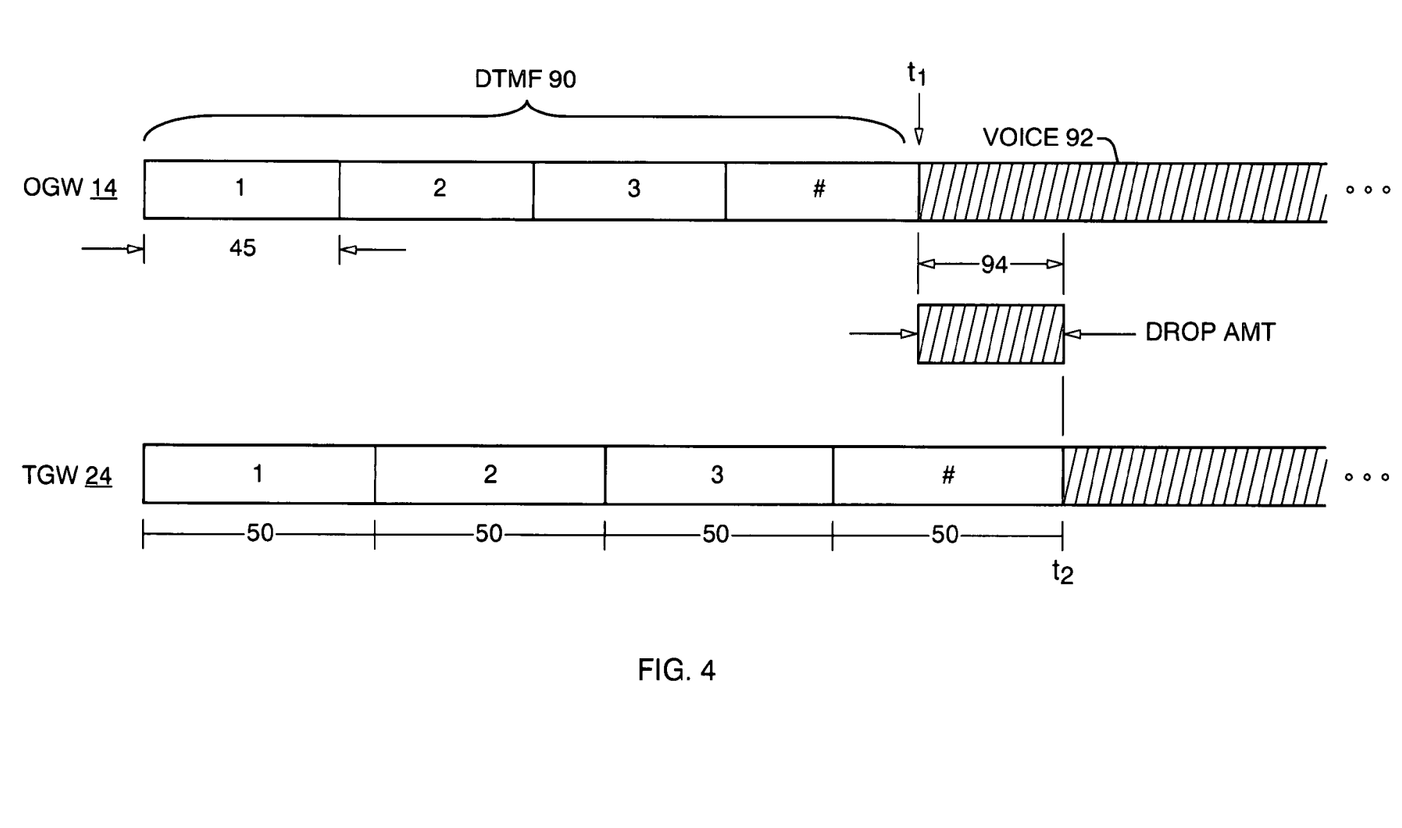
FIG. 4 is a high level timing diagram illustrating how initial portions of voice packets may also be dropped.

The situation is thus shown as in FIG. 4, which shows a timing diagram for the DTMF digits as detected at the originating gateway 12 and played back at the terminating gateway 24. In the example given the user has dialed the DTMF digits "1", "2", "3", "#" followed by a voice portion 92. Each of the digits in the DTMF portion 90 had an original duration of something less than the minimum amount of 50 ms. But the tones will be played back at TGW 24 each with a duration of 50 ms.

As can now be appreciated from the timing diagram, this causes a difficulty at the TGW 24. In particular, the voice portion 92 may be indicated as beginning at time T1, however, the playback of the DTMF tones does not end until a later time, T2. Thus, there is a potential conflict with the playback of signals during the time frame between T1 and T2.

In accordance with preferred embodiments of the present invention, the option will be to drop the voice packets occurring between times T1 and T2. This is a particularly preferred solution since it is quite common for users of voice telephony equipment to not immediately speak following the entry of DTMF digits. Thus, in a preferred embodiment, the first portion of the voice section 92 will not be played back at TGW 22. While this could be done by dropping packets at the TGW 22, it is in some instances more efficient to anticipate such at the OGW 16, and calculate the overlap before even the packets are sent. As was shown in FIG. 2, certain logic control signals from the less-than-minimum logic 44 can thus be fed to the voice packetizer 52. In such an instance, the voice packetizer 52 will not encode the overlapping voice packet portion 94. Only packets starting, for example, at a time stamp associated with time T2 will be encoded for transmission by OGW 16.

Figure 5:
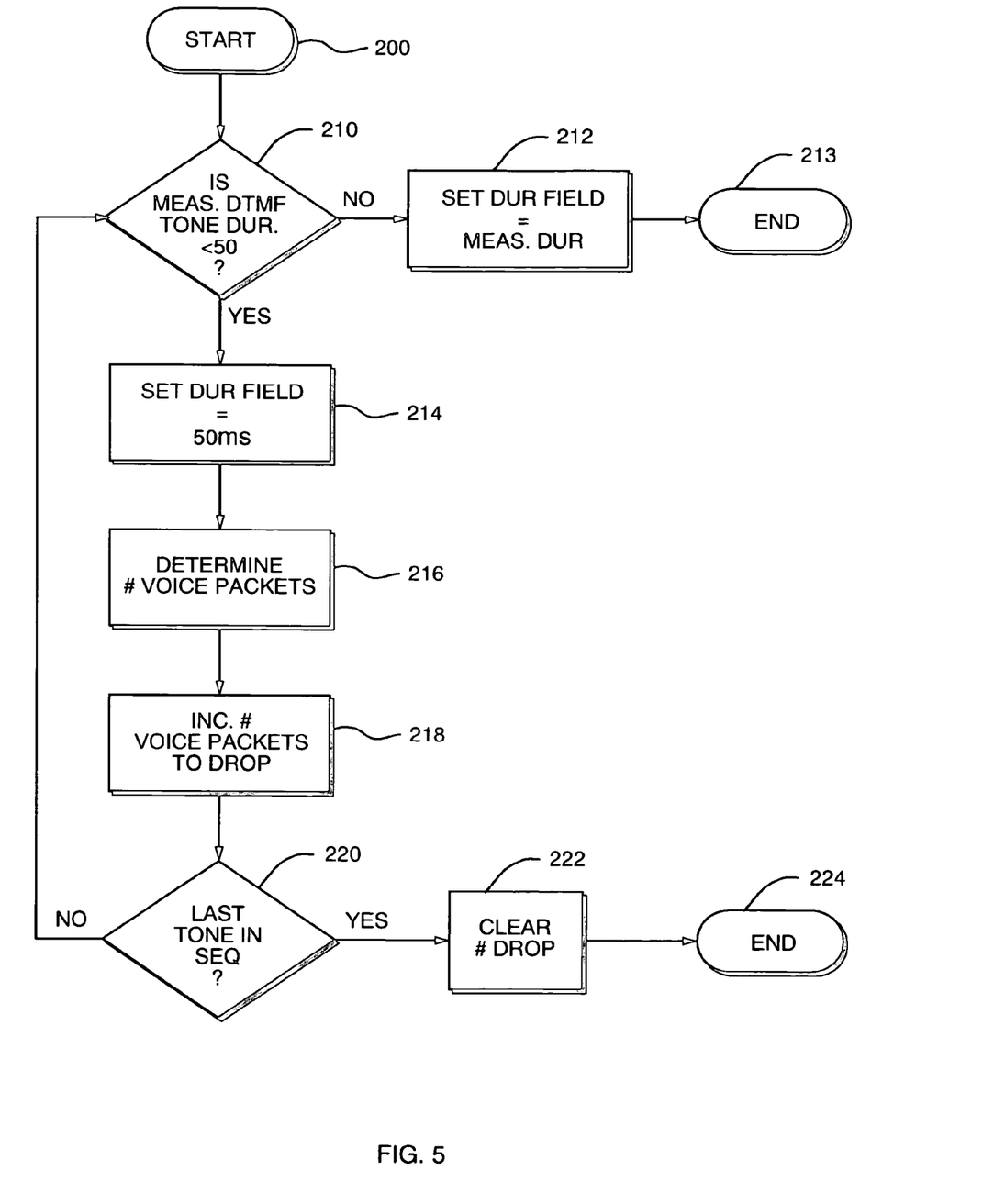
FIG. 5 is a flowchart of operations carried out in accordance with the present invention to adjust DTMF tone durations and to determine the dropping of initial voice packets.

A flow chart of the operations in accordance with the present invention is thus shown in FIG. 5. From an initial state 200, a state 210 is entered in which the measured DTMF tone duration is compared to the predetermined minimum amount (such as 50 ms). If the measured DTMF tone duration is not less than the predetermined amount, i.e., it is greater than or equal to the predetermined minimum amount, then the duration field 48-3 in the DTMF packet is set to the actual measured duration. The process may then end in step 213.

However, if the test in step 210 is positive, than the duration field 48-3 will be set to the minimum (50 ms). Prior to sending out the DTMF packet, the system will also determine a number of overlapping voice packets that might occur. In particular, this is done by comparing the measured duration to the minimum duration set in the duration field. For example, if the measured duration is 45 ms, (5 ms less than the forced duration of 50 ms), then a number of voice packets corresponding to the 5 ms of overlap time will be dropped. This number of voice packets to be dropped will then be incremented in step 218 and maintained as a running count.

When the last tone in the sequence is detected in state 220, then state 222 can be entered in which the number of packets to be dropped is known. This number can then used by the voice packetizer 52, to cause the indicated number of packets to be removed from the output voice packetizer 52. In this approach, the need to communicate the number of dropped packets from the originating to the terminating gateway is thus eliminated.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operating a network device connected to receive and transmit signals from and to both a circuit-switched network and a packet-switched network, the method comprising steps of:
    receiving, from the circuit-switched network, a telephony signal containing a voice signal component representing voice signals and a Dual Tone Multi Frequency (DTMF) signal component representing at least one DTMF tone;
    determining if a duration of the DTMF signal component is less than a predetermined duration;
    formatting a DTMF packet to represent at least the DTMF signal component, the DTMF packet including information indicating a duration of at least a minimum amount for the DTMF signal component if the DTMF signal component was less than the predetermined duration;
    transmitting the formatted data packet on the packet-switched network;

formatting an audio data packet to represent the audio signal components;
  determining if a time of expected playback of the DTMF packet would overlap with a time of expected playback of the audio data packet;
  dropping portions of the audio data packet; and
  transmitting the audio data packet onto the packet network.

2. A method as in claim 1 additionally comprising:
  if the determined duration of the DTMF signal component is less than the predetermined duration amount, setting a duration data parameter of the DTMF packet to indicate a minimum duration.

3. A method as in claim 2 additionally comprising:
  if the determined duration is not less than the predetermined duration amount, setting the duration parameter in the DTMF packet to a value that is based on the determined duration.

4. A method as in claim 1 additionally wherein the formatted data packet is an Real time Transport Protocol (RTP) packet.

5. A method as in claim 1 additionally wherein the dropped portion of the audio packet includes a portion where the audio packet would overlap in time with the DTMF packet.

6. A method as in claim 1 wherein the network device is a Voice over Internet Protocol (VoIP) gateway.

7. A communication apparatus comprising:
  a interface, for receiving a telephony signal containing a voice signal component representing voice signals and a Dual Tone Multi Frequency (DTMF) signal component representing at least one DTMF tone;
  a detector, for determining if a duration of the DTMF signal component is less than a predetermined duration;
  a packet formatter, for formatting a packet to represent at least the DTMF signal component, the formatted packet indicating a duration of at least a minimum amount for the DTMF signal component if the DTMF signal component was less than a predetermined duration;
  an audio packet formatter, for formatting an audio data packet to represent the audio signal components;
  a playback time analyzer, for determining if a time of expected playback of the DTMF tone represented in the formatted packet would overlap with a time of expected playback of the audio data packet; and
  the audio packet formatter further dropping one or more portions of the audio data packet.

8. An apparatus as in claim 7 wherein the packet formatter is additionally for, if the determined duration of the DTMF signal component is less than the predetermined duration amount, setting a duration data parameter of the formatted packet to indicate a minimum duration.

9. An apparatus as in claim 8 wherein the packet formatter is additionally for, if the determined duration is not less than the predetermined duration amount, setting the duration parameter in the formatted packet to a value that is based on the determined duration.

10. An apparatus as in claim 7 wherein the formatted packet is an Real time Transport Protocol (RTP) packet.

11. An apparatus as in claim 7 additionally wherein the dropped portion(s) of the audio packet include a portion where the audio packet would overlap in time with the DTMF tone represented in the formatted packet.

12. An apparatus as in claim 7 wherein the network device is an origin gateway in a Voice over Internet Protocol (VoIP) network.

13. An apparatus for operating a network device connected to receive and transmit signals from and to both a circuit-switched network and a packet-switched network, the apparatus comprising:
  means for receiving, from the circuit-switched network, a telephony signal containing a voice signal component representing voice signals and a Dual Tone Multi Frequency (DTMF) signal component representing at least one DTMF tone;
  means for determining if a duration of the DTMF signal component is less than a predetermined duration;
  means for formatting a DTMF packet to represent at least the DTMF signal component, the DTMF packet including information indicating a duration of at least a minimum amount for the DTMF signal component if the DTMF signal component was less than the predetermined duration;
  means for transmitting the formatted data packet on the packet-switched network;
  means for formatting an audio data packet to represent the audio signal components;
  means for determining if a time of expected playback of the DTMF packet would overlap with a time of expected playback of the audio data packet;
  means for dropping portions of the audio data packet; and
  means for transmitting the audio data packet onto the packet network.

14. An apparatus as in claim 13 additionally comprising:
  means for, if the determined duration of the DTMF signal component is less than the predetermined duration amount, setting a duration data parameter of the DTMF packet to indicate a minimum duration.

15. An apparatus as in claim 14 additionally comprising:
  means for, if the determined duration is not less than the predetermined duration amount, setting the duration parameter in the DTMF packet to a value that is based on the determined duration.

16. An apparatus as in claim 15 additionally wherein the formatted data packet is an Real time Transport Protocol (RTP) packet.

17. An apparatus as in claim 13 additionally wherein the dropped portion of the audio packet includes a portion where the audio packet would overlap in time with the DTMF packet.

18. An apparatus as in claim 13 wherein the network device is a Voice over Internet Protocol (VoIP) gateway.

19. A computer program product comprising computer readable instructions stored in a computer readable media and the instructions to be carried out on a data receiver system code containing instructions for receiving a telephony signal containing a voice signal component representing voice signals and a Dual Tone Multi Frequency (DTMF) signal component representing at least one DTMF tone;
  determining if a duration of the DTMF signal component is less than a predetermined duration:
  formatting a packet to represent at least the DTMF signal component, the formatted packet indicating a duration of at least a minimum amount for the DTMF signal component if the DTMF signal component was less than a predetermined duration;
  formatting an audio data packet to represent the audio signal components;
  determining if a time of expected playback of the DTMF tone represented in the formatted packet would overlap with a time of expected playback of the audio data packet; and further dropping one or more portions of the audio data packet.

20. A computer program product as in claim 19 wherein the packet formatter is additionally for, if the determined duration of the DTMF signal component is less than the predetermined duration amount, setting a duration data parameter of the formatted packet to indicate a minimum duration.

21. A computer program product as in claim 20 wherein the packet formatter is additionally for, if the determined duration is not less than the predetermined duration amount, setting the duration parameter in the formatted packet to a value that is based on the determined duration.

22. A computer program product as in claim 19 wherein the formatted packet is an Real time Transport Protocol (RTP) packet.

23. A computer program product as in claim 19 additionally wherein the dropped portion(s) of the audio packet include a portion where the audio packet would overlap in time with the DTMF tone represented in the formatted packet.

* * * * *